Sept. 13, 1966          I. B. RACHMAN          3,272,529
SAFETY CLAMP HANDLE CONVERTIBLE TO A WHEEL ASSEMBLY
Filed Feb. 25, 1964          2 Sheets-Sheet 1
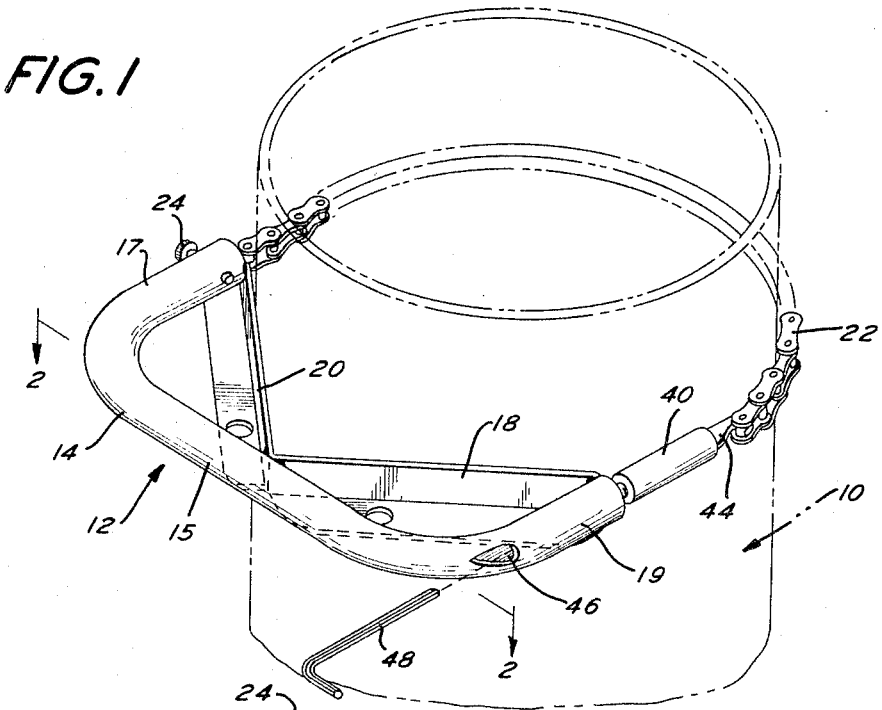
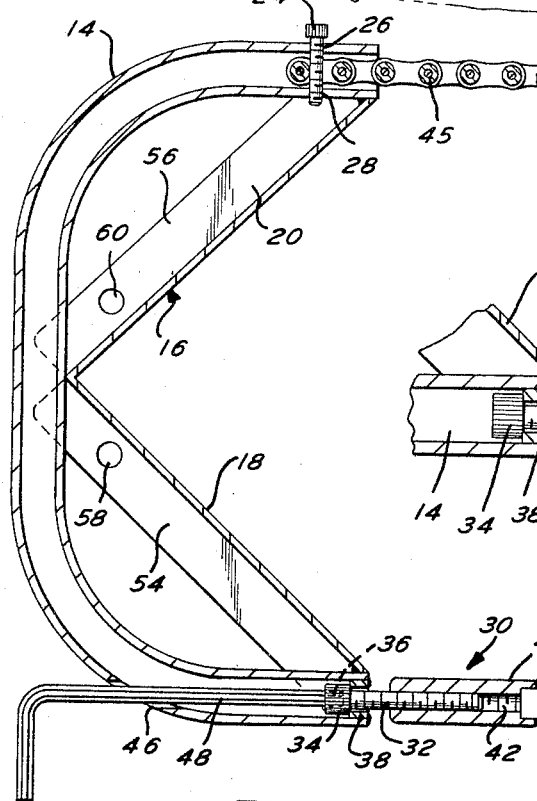
INVENTOR.
ISADORE B. RACHMAN
BY Arthur H. Seidel
ATTORNEY

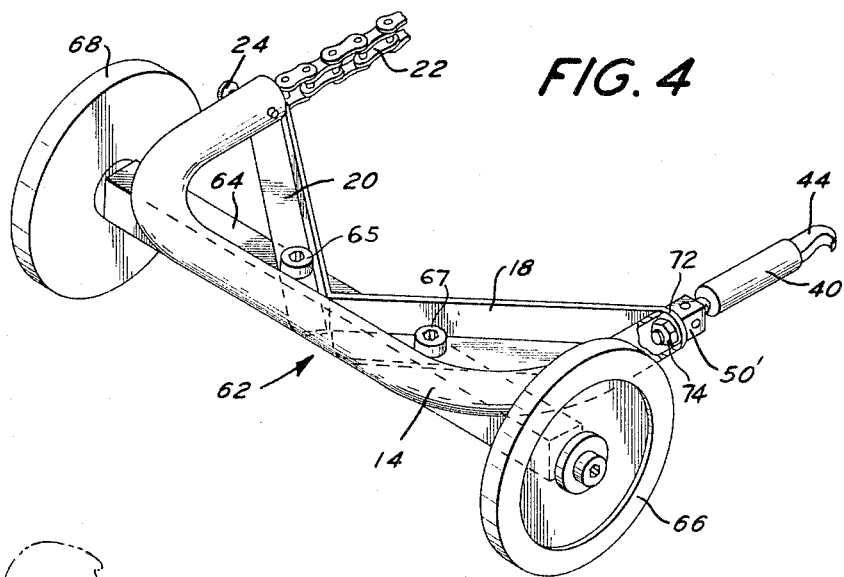
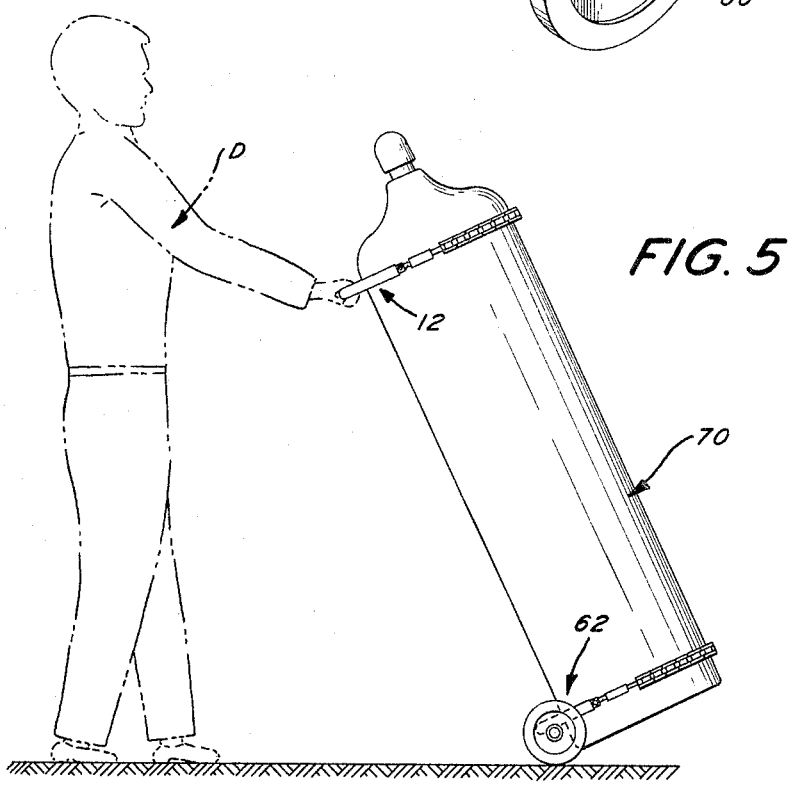

United States Patent Office 3,272,529
Patented Sept. 13, 1966

3,272,529
SAFETY CLAMP HANDLE CONVERTIBLE TO A
WHEEL ASSEMBLY
Isadore B. Rachman, Philadelphia, Pa., assignor to Metal
Dynamics, Inc., Philadelphia, Pa., a corporation of
Pennsylvania
Filed Feb. 25, 1964, Ser. No. 347,242
8 Claims. (Cl. 280—47.13)

This invention relates to means for holding and moving an elongated object.

In the delivery of elongated objects such as gas holding tanks or cylindrical drums, an appreciable amount of manual handling of these items is involved. For example, tanks and drums are usually manually placed upon a suitable transporation vehicle for delivery to the ultimate consumer. When the vehicle arrives at the delivery point, the tanks and drums are usually manually unloaded from the vehicle, and placed upon a material handling truck or some sort for conveyance to the end location of the object.

In view of the amount of manual handling involved in the delivery operation of elongated objects such as gas tanks or drums, the present invention was devised to increase manual handling capacity and efficiency in delivering these items. The present invention is accordingly directed to auxiliary means consisting of a handle which may be quickly and efficiently clamped in snug engagement about the gas tank or drum. By the use of such a handle, small elongated objects can be lifted bodily from transportation vehicles with ease. On the other hand, larger objects such as gas tanks and the like may be pulled from a transportation vehicle and slid along a supporting surface until its end desired location is reached.

The handle referred to above is also provided with means for quickly and efficiently converting it into a dolly. This is simply accomplished by providing an axle for mounting a pair of wheels which can easily be attached to the handle. The compound structure may be positioned in snug engagement with an elongated object such as a gas tank adjacent the bottom end thereof. A second handle structure may be fitted into snug engagement with the elongated tank adjacent the top end thereof. Hence, it will only be necessary to tilt the tank by pulling on the top handle and push it along the ground with the wheels of the bottom handle or dolly in contact therewith to relocate the tank quickly and easily.

The handle structure of the present invention is also useful in connecting the tank to a shelf or overhanging ledge where the tank is stored. This is accomplished through the use of brackets mounted directly upon the handle and which may be easily and efficiently secured to the shelf or overhanging ledge. Therefore, when the elongated object such as the gas tank is wheeled, carried or pulled to its final location by means of the handle of the present invention, the handle need not be removed from the tank but can be removably attached to a supporting surface wherein the tank can be supported in an upright condition at its final location. Since the tank is snugly held within the handle, there is little or no chance of the tank tipping over.

Accordingly, it is one of the objects of the present invention to disclose a safety clamp handle for holding and moving an elongated object from one location to another.

A further object of this invention is to disclose a handle of the character described which may quickly and easily be converted into a dolly for facilitating the movement of the elongated object from one location to another.

Still another object of this invention resides in the disclosure of a handle which may be used to relocate elongated objects and when the relocation is completed, can be attached to a supporting surface for maintaining the elongated object in a supported, upright position.

Yet another object of this invention resides in the disclosure of a handle structure of the aforementioned character which may be easily and efficiently placed in snug engagement around elongated objects of varying diameters or widths.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a perspective view of the handle structure comprising the subject matter of the instant invention and illustrating its application to an elongated cylindrical object shown in phantom.

FIGURE 2 is a cross sectional view taken substantially along the plane indicated by the arrows 2—2 of FIGURE 1.

FIGURE 3 is an enlarged detailed fragmentary sectional view of a slightly modified form of an adjustment means of the handle structure.

FIGURE 4 is a perspective view of still another form of the invention illustrating the conversion of the handle structure into a dolly.

FIGURE 5 is a side elevational view illustrating the use of a handle and dolly structure constructed in accordance with the principles of the present invention in the delivery of an elongated object such as a gas tank.

Referring now to the drawings in detail and specifically FIGURES 1 and 2, the present invention basically comprises a handle structure generally indicated by the numeral 12 for holding and moving an elongated object such as indicated at 10. The handle 12 comprises a generally U-shaped tubular casing 14 including a bight portion 15 and a pair of parallel legs 17 and 19. A cradle 16 is formed by a pair of angle iron members 18 and 20 secured to the casing 14 within the boundaries of the U-shaped structure. The angle iron member 18 is welded or otherwise attached to the leg 19 and the center of the bight 15 of the casing 14. Similarly, the angle iron member 20 is welded or otherwise attached to the leg 17 and the central portion of the bight 15 of the casing 14. The resultant cradle 16 is generally V-shaped in cross section wherein a cylindrical object such as 10 may be snugly seated in the cradle up against the angle iron members thereof.

In order to securely hold the elongated object 10 in seated engagement within the cradle 16, a flexible clamping means including a chain 22 is secured to the tubular casing 14 within the leg 17. The chain 22 is formed from a series of parallel links 43, each one of said parallel links being coupled to another by means of a connector 45. The chain 22 is adapted to be pushed into the leg 17 of the tubular casing 14 and securely held therein by means of a screw 24 threaded through a pair of aligned openings 26 and 28 on opposite sides of the leg 17. To coarsely adjust the length of the chain which is to be used, the chain 22 may be pushed further into the casing 14 after removal of the screw 24 which then may be repositioned for abutment with another of the connectors.

A fine adjustment means for varying the distance between the chain 22 and the cradle 16 is provided at 30 intermediate the other leg 19 of the casing and the end of the chain closest thereto. The fine adjustment means 30 includes a threaded shank 32 having a head 34. The head of the shank 34 includes a socket 36 for the reception of an Allen key 48, for the purpose which will be described hereinafter. The shank 32 is precluded from being removed from the interior of the hollow leg 19 of the casing 14 by abutment with a bushing 38 welded or otherwise secured at the entrance of the hollow leg 19. The bushing 38 precludes axial movement of the shank outwardly of the casing 14.

A nut 40 which is internally threaded at 42 is threadably connected to the shank 32. A hook 44 is integrally connected to the end of the nut 40 for removable engagement with the connectors 45 of the chain 22.

Therefore, upon rotation of the threaded shank 32, the nut 30 is adapted to be moved axially along the shank. If the shank 32 is rotated in such a fashion as to cause the nut 40 to move to the left as shown in FIGURE 2, the chain 22 will be brought into snug engagement with the elongated object 10 to firmly bind the object in the cradle 16. If a substantial quick adjustment is required, the hook 44 may be engaged with succeeding connectors 45 on the chain.

A slot 46 is formed at the juncture of the leg 19 and bight portion 15 of the casing 14 in axial alignment with the head 34 of the shank 32. An Allen key such as 48 may be inserted through the slot 46 into the socket 36 in head 34 of the shank 32. Rotation of the Allen key will cause rotation of the shank and effect the adjustment of the chain relative to the cradle 16.

FIGURE 3 illustrates an alternative means for effecting rotation of the shank 32. In this embodiment, a knurled collar or ring 50 is welded or otherwise secured to the shank 32. Therefore, mere rotation of the knurled collar 50 will cause rotation of the shank 32 and adjustment of the nut 40 in an axial direction. Finger rotation of the knurled collar 50 can be effected as far as possible. Then a suitable pin can be placed within an aperture 52 formed in the circumference of the collar 50 for effecting a fine type adjustment of the chain into snug engagement with the elongated object 10.

The use of the handle 12 is as follows:

The chain 22 is disengaged from the hook 44. The handle 12 is then positioned with its cradle 16 in abutment with the elongated object 10. The chain is then pulled around the object 10 until the hook 44 is connected to one of the link connectors 45. The Allen key 48 or the knurled collar 50 is then rotated to cause rotation of the shank 32 which will in turn cause axial movement of the nut 40 along the tank. This will draw the chain 22 into tight engagement with the object 10 and cause it to be firmly seated up against the cradle 16. If the chain is too short so that it will not reach the hook 44, more of the chain may be released from the interior of the casing 16 by removing and repositioning the screw 24 after the requisite amount of chain has been pulled from the casing. On the other hand, if upon fine adjustment, the chain is still loose and does not firmly clamp the elongated object 10 to the cradle 16, the chain 22 may be shortened by removing the screw 24 and pushing the chain further into the tubular casing 14 and repositioning the screw so that it abuts another of the connectors 45. It should be noted that the space between the legs 18 and 20 of the V-shaped cradle 16 and the adjacent portions of the U-shaped casing 14 defines a pair of areas wherein the handle may be grasped with two hands and firmly pulled or pushed.

In this manner, with the handle 12 placed around the elongated object 10, it may be quickly relocated.

As described previously, once the elongated object 10 has been relocated in its final storage position, it may be securely attached to a supporting shelf or ledge whereby it will be maintained in an upright position at all times. In order to accomplish this purpose, the horizontal legs 54 and 56 of the angle irons 18 and 20 respectively are formed with apertures 58 and 60. The handle 12 may be placed flat upon a supporting shelf or ledge and suitable fastening elements inserted through the apertures 58 and 60 to firmly lock the handle 12 to the supporting shelf or ledge. The chain 22 and a portion of the legs 17 and 19 as well as a portion of the cradle 16 may protrude outwardly from the ledge or shelf whereby the elongated object 10 can be supported in an upright position.

With specific reference to FIGURE 4, the handle 12 may be quickly and easily converted into a dolly for aiding in the movement of the elongated object 10. The dolly 62 will be formed by inserting bolts 65 and 67 through axle 64 and the apertures 58 and 60. The nuts threaded to the free ends of the bolts 65 and 67 are not visible in FIGURE 4. A pair of wheels 66 and 68 are rotatably mounted upon the ends of the axle 64 which protrude laterally from the legs 17 and 19. Except for the portions supporting the wheels 66 and 68, the axle 64 is preferably square or rectangular in cross section.

In dolly 62, the handle differs from handle 12 by providing an extension 72 on angle iron 18. Extension 72 is welded to the end face of the handle leg. Thus, extension 72 eliminates the need for a separate element such as bushing 38. The fine adjustment means is similar to that illustrated in FIGURE 3 and described above. Instead of a knurled collar 50, a square block 50' (preferably ½ x ½ inch) is provided. Thus, block 50' is adapted to be rotated by a conventional wrench.

Block 50' is internal with a threaded shank as described above. A nut 74 is threaded to the shank, with extension 72 being between block 50' and nut 74. Also, block 50' has a pair of holes extending therethrough so that a rod may be inserted thereinto to facilitate turning block 50'.

FIGURE 5 illustrates the use of the dolly 62 in conjunction with an elongated object such as a gas tank 70. The dolly 62 may be positioned around the tank 70 in the above-described manner adjacent the bottom end thereof. A handle 12 is positioned in the described manner adjacent the upper end of the tank 70. The delivery man D can tilt the tank 70 about the wheels 66 and 68 to the position illustrated in FIGURE 5. He then can grasp the handle 12 and pull or push the tank 70 to its desired location, the tank 70 being wheeled along the ground surface by means of the dolly 62. As will be apparent, the elongated object need not be round in cross section. The V-shaped cradle 16 is adapted to accommodate round, square, triangular, etc. objects.

The present invention may be embodied in other specific forms without departing from the spirit or essential attributes thereof and, accordingly, reference should be made to the appended claims, rather than to the foregoing specification as indicating the scope of the invention.

I claim:

1. Means for holding and moving an elongated object or the like comprising a generally U-shaped casing, generally V-shaped cradle means secured to said casing for seating an elongated object, a pair of handles defined by said casing and said V-shaped cradle means, flexible clamping means secured to one end of said casing and being in opposed relation to said cradle means for firmly holding an elongated object in seated engagement with said cradle means, and means intermediate the other end of said casing and one end of said clamping means for adjusting the distance between said clamping means and said cradle means, said adjusting means including a rotatable, threaded shank extending from said other end of the casing, means attached to said one end of said casing for precluding axial movement of said shank, nut means threadably connected to said shank for axial movement in response to rotation of said shank and means integral with said nut means for removably engaging said flexible clamping means.

2. Means in accordance with claim 1 wherein said flexible clamping means includes a chain comprising a series of links, and said removable engaging means includes a hook adapted to be engaged with individual ones of said links, whereby adjustment of the distance between said clamping means and said cradle means can be effected.

3. Means in accordance with claim 1 including ring means secured to said threaded shank for rotating said shank to induce axial movement of said nut means.

4. Means for holding and moving an elongated object or the like comprising a generally U-shaped casing, cradle means secured to said casing for seating an elongated object, flexible clamping means secured to one end of said casing in opposed relation to said cradle means for firmly holding an elongated object in seated engagement with said cradle means, means intermediate the other end of said casing and one end of said clamping means for adjusting the distance between said clamping means and said cradle means, said cradle means being generally V-shaped in cross section and being secured to said casing within the confines of the ends of said U-shaped casing, a pair of handles on said casing defined by the legs of the V-shaped cradle means and the adjacent portions of the U-shaped casing.

5. Means for holding and moving an elongated object or the like comprising a generally U-shaped casing, cradle means secured to said casing for seating an elongated object, flexible clamping means secured to one end of said casing in opposed relation to said cradle means for firmly holding an elongated object in seated engagement with said cradle means, and means intermediate the other end of said casing and one end of said clamping means for adjusting the distance between said clamping means and said cradle means, said adjusting means including a rotatable, threaded shank extending from said other end of the casing, means attached to said casing and for precluding axial movement of said shank, nut means threadably connected to said shank for axial movement in response to rotation of said shank, means integral with said nut means for removably engaging said flexible clamping means, ring means secured to said thread shank for rotating said shank to induce axial movement of said nut means, said ring means including a knurled collar, an aperture in said collar adapted to receive a pin whereby insertion of said pin within said collar and rotation of said collar and shank will insure snug engagement of said flexible clamping means with an elongated object.

6. Means for holding and moving an elongated object or the like comprising a generally U-shaped casing, cradle means secured to said casing for seating an elongated object, flexible clamping means secured to one end of said casing in opposed relation to said cradle means for firmly holding an elongated object in seated engagement with said cradle means, said means intermediate the other end of said casing and one end of said clamping means for adjusting the distance between said clamping means and said cradle means, said adjusting means including a rotatable, threaded shank extending from said other end of the casing, means attached to said casing and for precluding axial movement of said shank, nut means threadingly connected to said shank for axial movement in response to rotation of said shank, means integral with said nut means for removably engaging said flexible clamping means, said U-shaped casing being tubular in cross section, slot means at the junction of a leg and bight portion of said casing in axial alignment with said shank for receiving a tool for engaging said shank and imparting rotation thereto.

7. Means for holding and moving an elongated object or the like comprising a generally U-shaped casing, cradle means secured to said casing for seating an elongated object, flexible clamping means secured to one end of said casing and being in opposed relation to said cradle means for firmly holding an elongated object in seated engagement with said cradle means, at least one handle in said casing defined between the cradle and the adjacent portions of the U-shaped casing, and further means carried by said cradle means for attaching said cradle means and casing to a supporting surface.

8. Means in accordance with claim 7 wherein said further means is readily attachable to an axle means, and wheel means mounted upon said axle means for rendering said casing mobile.

References Cited by the Examiner

UNITED STATES PATENTS

| | | | |
|---|---|---|---|
| 1,479,351 | 1/1924 | Winterbottom | 280—47.13 X |
| 2,743,938 | 5/1956 | Nash | 280—47.13 |
| 2,745,673 | 5/1956 | Koepke et al. | 280—179 |
| 2,904,345 | 9/1959 | Bradley | 280—47.13 |
| 3,013,807 | 12/1961 | Winterhoff | 280—179 |
| 3,082,892 | 3/1963 | Cox | 280—414 X |

FOREIGN PATENTS 578,688  7/1946  Great Britain.

BENJAMIN HERSH, *Primary Examiner.*

J. A. PEKAR, *Assistant Examiner.*